United States Patent

Aebersold et al.

[11] Patent Number: 6,127,646
[45] Date of Patent: *Oct. 3, 2000

[54] APPARATUS FOR BUTTING TWO WORKPIECES TOGETHER FOR A WELDING OPERATION

[75] Inventors: Hans Aebersold, Birmensdorf; Norbert Gross, Zürich; Werner Urech, Kaiserstuhl, all of Switzerland

[73] Assignee: Elpatronic AG, Bergdietikon, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/647,173

[22] Filed: May 9, 1996

[30] Foreign Application Priority Data

May 15, 1995 [CH] Switzerland ............. 01406/95

[51] Int. Cl.[7] ............. B23K 26/42; B23K 26/20; B23K 37/04

[52] U.S. Cl. ............. 219/121.63; 219/158; 219/161; 228/44.3; 228/49.4

[58] Field of Search ............. 219/101–105, 219/121.63, 121.64, 121.82, 158, 160, 161; 228/44.3, 49.4, 151, 173.2, 173.6; 108/1–3, 42, 51.11, 59, 64; 269/43, 56, 135, 289 R, 37; 248/560

[56] References Cited

U.S. PATENT DOCUMENTS

| | | | |
|---|---|---|---|
| 1,001,888 | 8/1911 | Rietzel | 219/101 |
| 1,343,346 | 6/1920 | Buckley | 228/44.3 |
| 3,384,731 | 5/1968 | Draving | 219/161 X |
| 3,593,907 | 7/1971 | Hahne | 228/44.3 X |
| 4,139,145 | 2/1979 | Moore | 228/212 |
| 5,023,427 | 6/1991 | Neiheisel et al. | 219/121.82 |
| 5,098,005 | 3/1992 | Jack | 219/121.82 X |
| 5,169,051 | 12/1992 | Noe | 228/5.7 |
| 5,450,996 | 9/1995 | Helton et al. | 219/160 X |
| 5,475,196 | 12/1995 | Lisec | 219/121.82 X |
| 5,532,450 | 7/1996 | Iwai et al. | 219/121.63 |

FOREIGN PATENT DOCUMENTS

| | | | |
|---|---|---|---|
| 1274607 | 9/1981 | France . | |
| 4100302 | 10/1996 | Germany . | |
| 60-111796 | 6/1985 | Japan . | |
| 5-161994 | 6/1993 | Japan | 219/121.63 |
| 6-304786 | 11/1994 | Japan | 219/158 |

*Primary Examiner*—Gregory Mills
*Attorney, Agent, or Firm*—McCormick, Paulding & Huber LLP

[57] ABSTRACT

In an apparatus for connecting two workpieces together by welding, the workpieces lie on supporting surfaces and are butted together at their edges to form a butt joint. The workpieces are subjected to pressure on the side opposite to the supporting surfaces. At least one supporting surface is capable of yielding under pressure, and, in so doing, changes its position in relation to the butt joint, so as to reduce any gap between the workpieces.

13 Claims, 3 Drawing Sheets

APPARATUS FOR BUTTING TWO WORKPIECES TOGETHER FOR A WELDING OPERATION

BACKGROUND OF THE INVENTION

The invention relates to an apparatus for connecting two workpieces together by welding, in which the workpieces lie on supporting surfaces, are butted together at their edges to form a butt joint, and are subjected to pressure on the opposite side to the supporting surfaces.

Various welding processes are known for joining two workpieces together, particularly for the fabrication of body components for motor vehicles. Especially worthy of note is laser welding in which the sheet-metal parts are butt-welded to form compound panels.

In the nature of things, the edges of the sheets which are to be welded together are not absolutely straight, and have a certain amount of waviness. This means that the butt joint is closed only where the wavy edges are in contact; at other points the edges stand back from one another, leaving the joint open. According to the industry standard in Europe for laser welding, the gap should not exceed a width of 0.08 mm at any point. This very small tolerance makes it necessary to prepare the edges of the sheets for welding. This is usually done by trimming by laser beam. However, it may also be done by a process according to EP-A 0565846, in which the sheets are butted together and at least one edge is then plastically deformed against the other, closing the gap so that its maximum width no longer exceeds 0.08 mm.

A welding operation usually has the following cycle:

the workpieces are butted together in pairs, without prepared edges, positioned without significant sideways pressure, and fixed by means of clamp elements. At this point the workpieces are first subjected to force. The workpieces may then be processed, for example they may be dressed as described in EP-A 0565846 to bring the gap within the permitted tolerance. This processing causes a second application of force to the positioning system, in which considerable lateral forces can occur. Finally, further, mainly sideways-acting force effects occur as a result of thermal stresses in the laser welding process.

These forces are capable of affecting the joint gap, particularly if the tolerances in the machine allow relative movement of the sheets to be welded, for example if the sheets positioned in pairs are fixed on a clamping table or shuttle. On a shuttle there may be clamped several pairs of workpieces to be joined together. When the first pair of workpieces are processed, the force effect also acts on the other workpiece-pairs.

Logically, the welding machine should be constructed in such a way that the tolerances in the machine are smaller than usual; also, the structure should be made stronger so that the forces generated are no longer capable of altering the relative position of the sheets to be welded.

However, this obvious-seeming solution to the problem results in an extremely costly construction.

SUMMARY OF THE INVENTION

A basic object of the present invention is to develop an apparatus of the above-stated kind whereby opening of the butt joint and (or) relative displacement of the workpieces is prevented, or inhibited, relatively simply after positioning of the workpieces has taken place.

The way in which this object is realised is by making at least one supporting surface capable of yielding under pressure and, in so doing, changing its position in relation to the butt joint.

This is achieved by constructing the supporting surface so that, although it is capable of yielding, it is only able to move on a predetermined curve or arc; the permitted direction of movement is then towards the gap.

When the sheets are positioned, which is done without significant sideways pressure in a machine according to the state of the art an application of force may cause the joint to open. If this happens, the welding operation is performed in an incorrect position, resulting in a defective seam.

To maintain their position, the workpieces must always be held by suitable clamp elements during the welding operation. The present invention makes use of the pressure of these clamp elements, in that the designed elasticity of the structure allows the supporting surface to be deflected towards the gap when it yields under pressure. Towards the gap, however, the positioned sheets are supported against one another at their butted edges.

Thus the clamping pressure results in a force pressing the sheets together laterally, and opposing relative displacement of the sheets.

Of course, this force does not act unless all corresponding tolerances in the machine have been closed in the "movement towards the gap" direction.

In other words:

if force is applied as stated in the introductory remarks, a change in the relative position of the sheets no longer occurs, as, owing to the elasticity of the structure, a considerable lateral force tending to close the gap is brought to bear and any tolerances in the machine which might allow relative displacement have already been taken up by the one-sided loading.

In one example of the performance of the invention, the supporting surface is a surface of a platen or limb which tilts or rocks about a pivot axis. This axis is remote from the butt joint, and is located under one edge of the supporting surface so that this edge describes a short arc of a circle when the platen, or the limb as the case may be, turns about the pivot axis. This allows any gap between the adjacent edges of two supporting surfaces to be reduced. The sheets to be welded bear against one another, developing a lateral force pressing them together.

The supporting surface may be given a high-friction coating to improve its grip on the workpiece. Another possibility is to use an underlay or the like, which then forms the actual supporting surface for the workpiece, whose edge will then be located further still above the pivot axis. However, the positive effect of the invention is still afforded where the supporting surface is not actually displaced by the clamping pressure but always bears laterally against the other supporting surface, because of the butted edges of the sheets. In this case also, the lateral fixing force is developed, offsetting the tolerances in the machine and counteracting the effects of the application of force, so that a change in the relative position of the sheets no longer occurs.

BRIEF DESCRIPTION OF THE DRAWINGS

Further advantages, features and particulars of the invention will be disclosed in the following description of preferred embodiments given by way of example, and with reference to the drawings in which.

DESCRIPTION OF THE PREFERRED EMBODIMENTS

Figure 1:
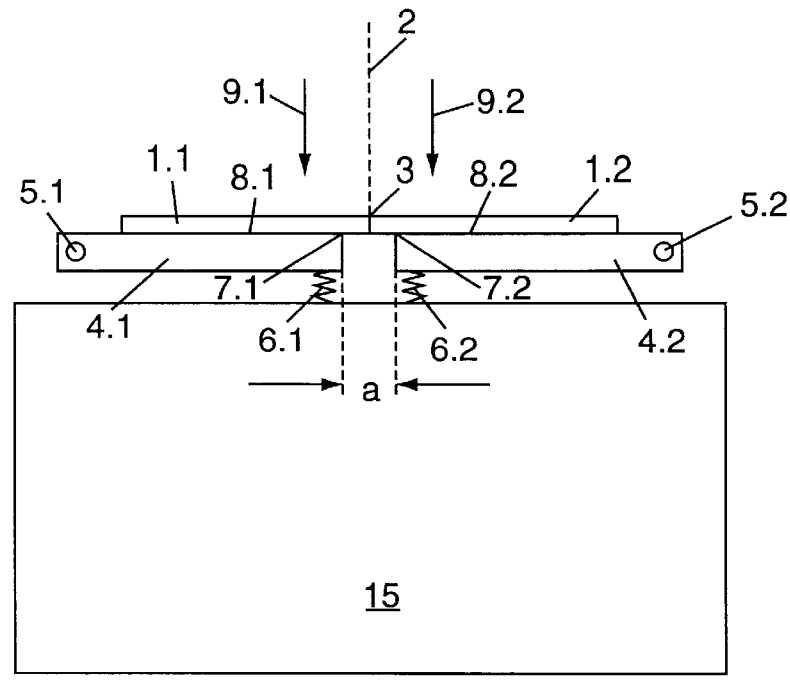
FIG. 1 is a diagrammatic side view of part of an apparatus according to the invention for joining two workpieces together.

As shown in FIG. 1, two workpieces 1.1 and 1.2 are to be joined to one another by welding. In the drawing, a corresponding laser beam 2 is indicated by a dotted line. Joining takes place in the region of the butt joint 3 formed by the edges of the abutting workpieces 1.1 and 1.2.

The two workpieces 1.1 and 1.2 lie on platens 4.1 and 4.2 respectively, the platens being capable of being tilted slightly about pivot axes 5.1 and 5.2 respectively. In the starting position the two platens 4.1 and 4.2 are located in one plane, and are held in that plane by corresponding stored energy devices 6.1 and 6.2. A corresponding edge 7.1 and 7.2 of the platens 4.1 and 4.2 is located above the pivot axes 5.1 and 5.2. Thus the platens 4.1 and 4.2 form yielding supporting surfaces 8.1 and 8.2 for the workpieces 1.1 and 1.2 respectively.

If pressure is applied to the workpieces 1.1 and 1.2 in the region close to the butt joint 3, on the opposite side to the platens as indicated by the arrows 9.1 and 9.2, the platens 4.1 and 4.2 are tilted slightly about their respective pivot axes 5.1 and 5.2. Since the edges 7.1 and 7.2 are located above the pivot axes 5.1 and 5.2, they describe a circular arc about their respective pivot axes, the tilting produced by the downward pressure reduces any gap between the two edges 7.1 and 7.2. Since the application of pressure to the workpieces 1.1 and 1.2 is simultaneously keeping them clamped under pressure between the device applying the pressure and the platens 4.1 and 4.2, the workpieces 1.1 and 1.2 are unable to yield sideways, so that the butt joint 3 remains subject to a closing force, and cannot open. This prevents relative movement of the sheets 1.1 and 1.2.

Figure 2:
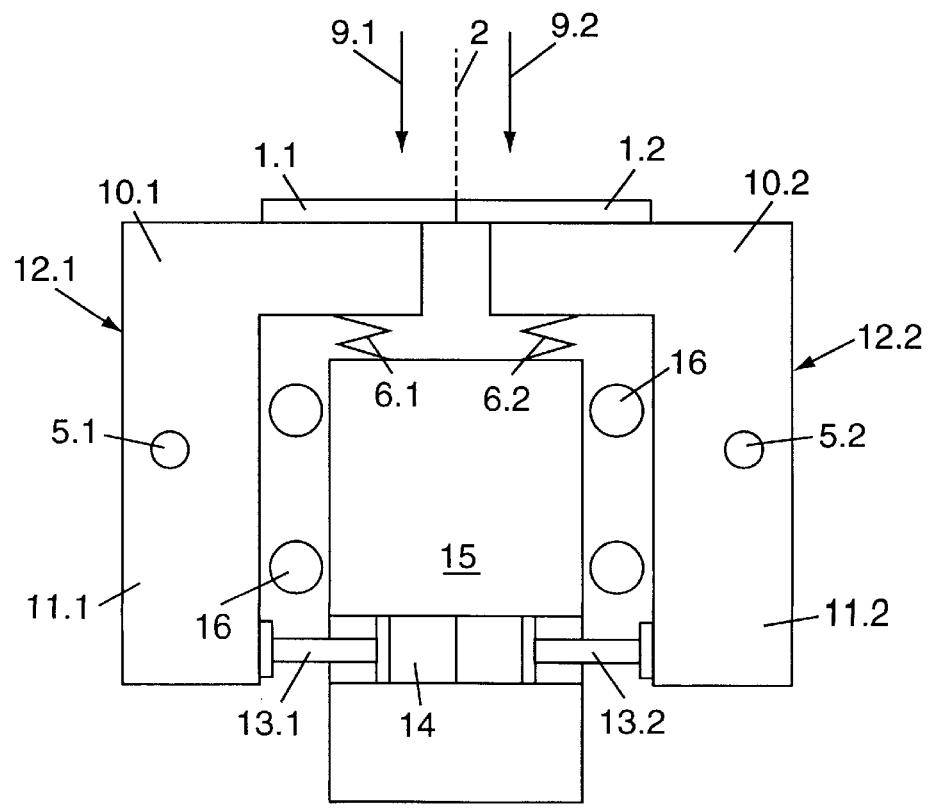
FIGS. 2 to 5 are diagrammatic side views of further embodiments of the apparatus outlined in FIG. 1.

The embodiment of the apparatus according to the invention for joining two workpieces together shown in FIG. 2 differs from that shown in FIG. 1 in that limbs 10.1 and 10.2 are provided instead of the platens 4, and are joined to supporting webs 11.1 and 11.2 respectively, extending perpendicularly thereto. Together with the supporting webs 11.1 and 11.2, the limbs 10.1 and 10.2 form cranked levers pivotable about the pivot axes 5.1 and 5.2 respectively.

The advantage of this arrangement is that the cranked levers 12.1 and 12.2, besides being acted on by the pressure 9.1 and 9.2 on the workpieces 1.1 and 1.2, can be made to turn about the pivot axes 5.1 and 5.2, which may be advantageous particularly in relation to the tolerances in the machine. In the present example, the free ends of the two supporting webs 11.1 and 11.2 are acted on by corresponding rams 13.1 and 13.2. The rams 13.1 and 13.2 may form part of a piston/cylinder unit 14. This piston/cylinder unit 14 is located within a machine table 15 against which the cranked levers 12.1 and 12.2 are supported through corresponding thrust elements 16 and/or the abovementioned stored energy devices 6.1 and 6.2.

Figure 3:
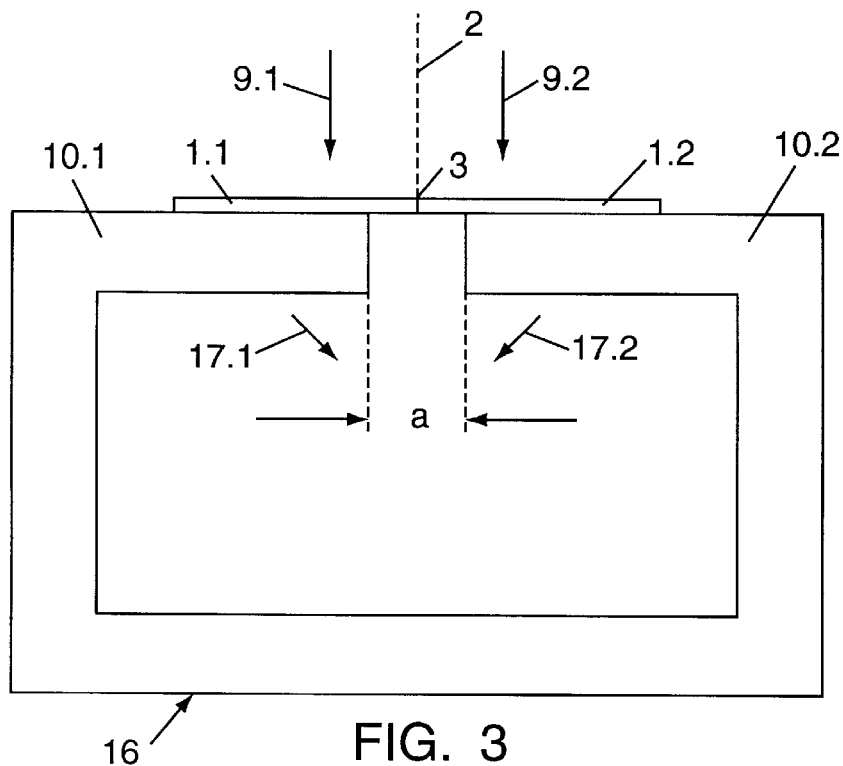
Figure 4:
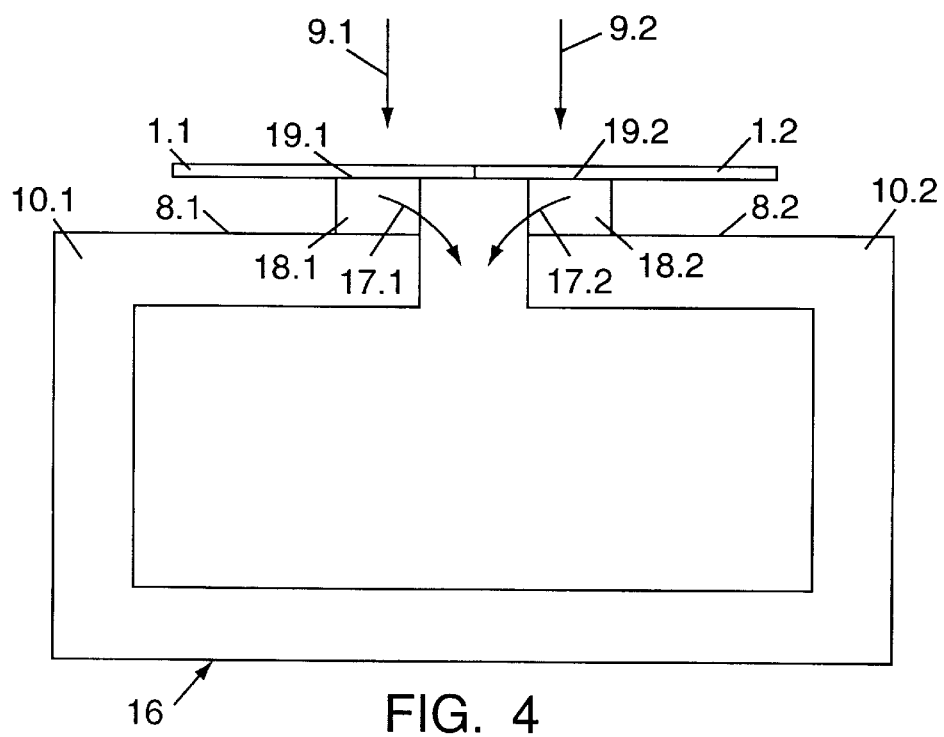

In the embodiments shown in FIGS. 3 and 4, the limbs 10.1 and 10.2 are joined together by a U-shaped yoke 16, making the pivot axes 5.1 and 5.2 unnecessary. The limbs 10.1 and 10.2 are preferably joined to the yoke 16 in one piece so that the flexibility is determined by the material of the yoke 16. This means that the limbs 10.1 and 10.2, or their supporting surfaces for the workpieces 1.1 and 1.2, do not execute a motion in a circular arc about a pivot point, but a rocking motion towards the butt joint 3, as indicated by the arrows 17.1 and 17.2. The intended object is thus achieved by the structural elasticity of the machine acting in a predetermined manner.

FIG. 4 goes on to show how platens 18.1 and 18.2 can be placed between the supporting surfaces 8.1 and 8.2 and the workpieces 1.1 and 1.2, respectively. These platens preferably have high-friction surfaces 19.1 and 19.2, so that the workpieces 1.1 and 1.2 will not be displaced laterally with respect to these surfaces 19.1 and 19.2. Incidentally, these platens 18 with high-friction surfaces 19 may be used in all embodiments of the invention.

Figure 5:
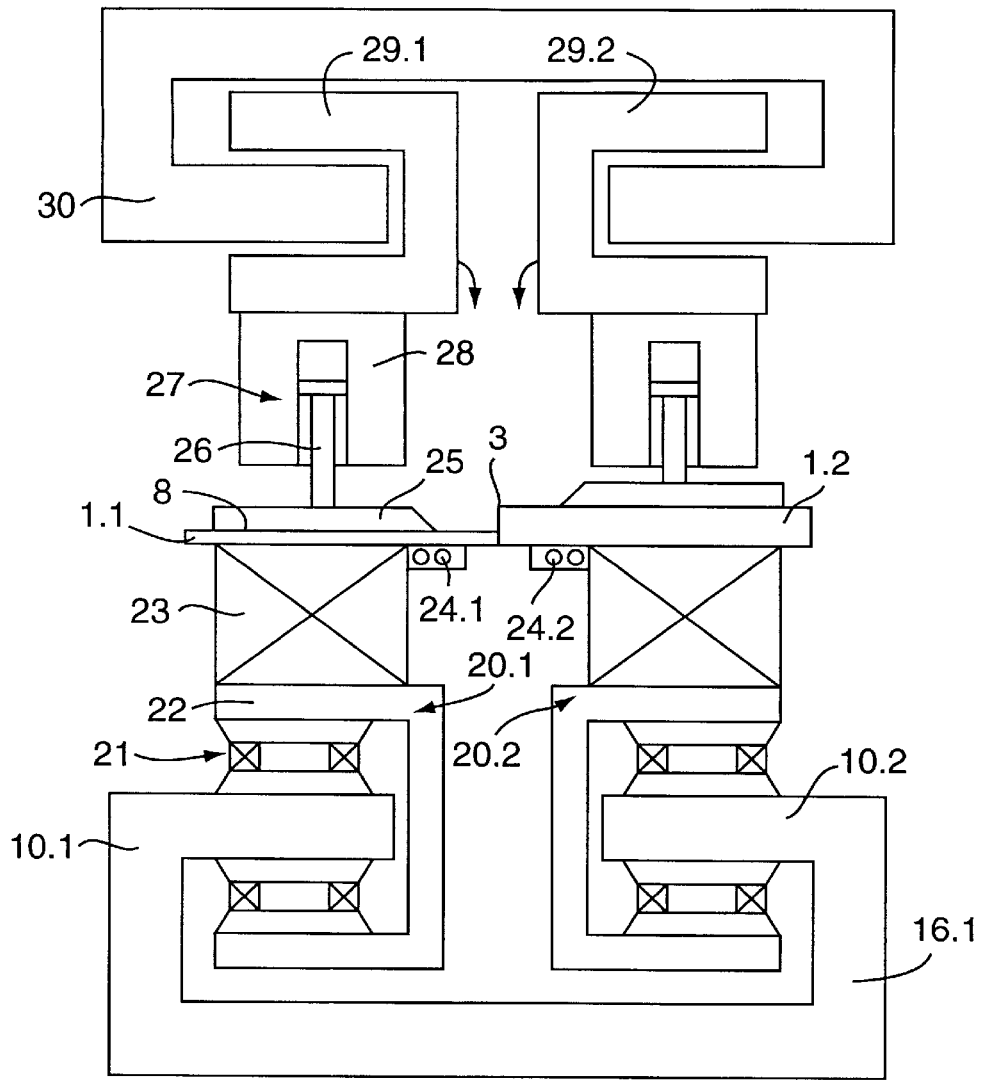

In the embodiment shown in FIG. 5, the machine casing 16.1 is in the form of a yoke. Each limb 10.1 and 10.2 of this machine casing 16.1 is partly surrounded by a C-shaped clamping table section 20.1 and 20.2 respectively. Each clamping table section 20.1 and 20.2 bears against the respective limb 10.1 and 10.2 both above and below through bearings 21. The bearings 21 allow the clamping table sections 20.1 and 20.2 to be traversed in the longitudinal direction of the apparatus, the table sections 20.1 and 20.2 usually being joined together to form a common shuttle.

A magnet or magnets 23 which forms a supporting surface 8 on which the workpieces 1.1 and 1.2 are fixed lies on a table platen 22 of the clamping table sections 20.1 and 20.2 respectively. The workpieces 1.1 and 1.2 bear against one another in the region of a butt joint 3. Cooling devices 24.1 and 24.2, which have conduits for cooling medium passing through them, are preferably arranged close to the joint on either side. These cooling devices 24 are for cooling a welded seam which joins the two workpieces 1.1 and 1.2 together.

A press shoe 25 rests on each workpiece 1.1 and 1.2, for applying pressure to the respective workpiece 1.1 and 1.2. The press shoe 25 is connected by a piston rod 26 to a hydraulic or pneumatic piston/cylinder unit 27, which in turn is housed in a block 28.

It is preferable, although not absolutely necessary, for the block 28 to be suspended from a C-shaped yoke 29 with a mounting (details not shown) on a hanger 30 so that when deflection of the limbs 10.1 and 10.2 occurs both yokes 29.1 and 29.2 are also able to tilt slightly towards one another.

Figure 6:
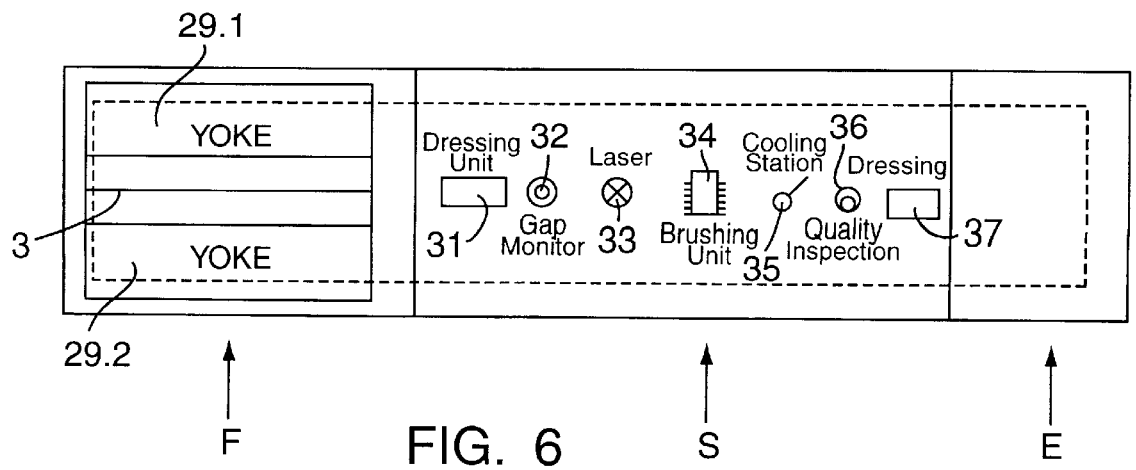
FIG. 6 is a plan view of parts of the apparatus shown in FIG. 5.

From FIG. 6 it can be seen that the shuttle, of which only the two yokes 29.1 and 29.2 are visible, runs the whole length of the apparatus. It is shown in a loading station F, from which it passes to a welding station S, and thence to an unloading station E from which the welded workpieces are removed.

In the welding station, the butt joint is preferably dressed by a dressing unit 31 as described in EP-A 565846. The dressing unit 31 is preferably followed by a gap monitor 32 allowing a laser beam 2 located next along the machine to track the line of the gap.

After the butt joint has been welded by the laser 33, the weld seam is preferably treated in a brushing unit 34 and oiled in a cooling station 35. These treatments are followed by a quality inspection 36 and, if necessary, dressing 37.

The workpieces 1.1 and 1.2 pass through all these treatments while clamped to the shuttle.

What is claimed is:

1. Apparatus for butt joining two workpieces together at their edges for a welding operation, the apparatus comprising:

means for applying clamping pressure to workpieces; and
   at least one means including at least one surface for supporting workpieces at a welding area and for flexibly yielding under pressure from the clamping means such that the surface moves laterally toward the welding area to thereby laterally force and butt together edges of the workpieces.

2. Apparatus as defined in claim 1, further including a support member to be interposed between the at least one supporting surface and the workpieces.

3. Apparatus as defined in claim 2, wherein the support member includes a high-friction surface on a side to face the workpieces.

4. Apparatus as defined in claim 1, wherein the supporting means includes two supporting surfaces spaced from one another in a plane as surfaces of two limbs coupled to one another by a flexible U-shaped yoke.

5. Apparatus as defined in claim 1, wherein the supporting means includes two supporting surfaces spaced from one another in a plane as surfaces of two limbs of a flexible U-shaped yoke, the two limbs being formed integrally as one piece with the U-shaped yoke.

6. Apparatus as defined in claim 5, further including a clamping table section mounted on each of the limbs such that the clamping table sections are movable in a longitudinal direction along a width of the limbs.

7. Apparatus as defined in claim 6, wherein the clamping table sections are coupled together to form a common shuttle.

8. Apparatus as defined in claim 7, further including a magnet disposed on and to be interposed between each clamping table section and the workpieces.

9. Apparatus as defined in claim 8, further including a ferromagnetic press shoe associated with each magnet to clamp the workpieces on a side of the workpieces opposite to that of the associated magnet.

10. Apparatus for butt joining two workpieces together at their edges for a welding operation, the apparatus comprising:

two supporting surfaces for supporting workpieces, the surfaces being spaced from one another and capable of yielding under pressure so as to change position in relation to the butt joint, the two supporting surfaces being surfaces of two limbs of a U-shaped yoke.

11. Apparatus as defined in claim 10, further including a clamping table section mounted on each of the limbs to form a shuttle such that the shuttle is movable in a longitudinal direction along a width of the limbs.

12. Apparatus as defined in claim 11, further including a magnet disposed on and to be interposed between each clamping table section and the workpieces.

13. Apparatus as defined in claim 12, further including a ferromagnetic press shoe associated with each magnet to clamp the workpieces on a side of the workpieces opposite to that of the associated magnet.

* * * * *